US012560181B2

(12) United States Patent
Alvarez

(10) Patent No.: US 12,560,181 B2
(45) Date of Patent: Feb. 24, 2026

(54) HYDRAULIC POWER BOOSTING SYSTEM

(71) Applicant: Bernadette Olvera Alvarez, Queretaro (MX)

(72) Inventor: Bernadette Olvera Alvarez, Queretaro (MX)

( * ) Notice: Subject to any disclaimer, the term of this patent is extended or adjusted under 35 U.S.C. 154(b) by 98 days.

(21) Appl. No.: 18/291,838

(22) PCT Filed: Apr. 13, 2022

(86) PCT No.: PCT/MX2022/050036
§ 371 (c)(1),
(2) Date: Jan. 24, 2024

(87) PCT Pub. No.: WO2023/080771
PCT Pub. Date: May 11, 2023

(65) Prior Publication Data

US 2024/0360847 A1 Oct. 31, 2024

(30) Foreign Application Priority Data

Nov. 3, 2021 (MX) .................... MX/a/2021/013474

(51) Int. Cl.
*F15B 3/00* (2006.01)
*F15B 15/20* (2006.01)

(52) U.S. Cl.
CPC ................ *F15B 3/00* (2013.01); *F15B 15/20* (2013.01)

(58) Field of Classification Search
CPC ............ F15B 3/00; F04B 9/117; F04B 9/1172
See application file for complete search history.

(56) References Cited

U.S. PATENT DOCUMENTS

| | | | | |
|---|---|---|---|---|
| 3,234,882 | A | 2/1966 | Douglas | |
| 4,470,771 | A | 9/1984 | Hall | |
| 2005/0133090 | A1 | 6/2005 | Couturier | |
| 2022/0205462 | A1 * | 6/2022 | Olvera Díaz | F15B 15/18 |

FOREIGN PATENT DOCUMENTS

| | | | |
|---|---|---|---|
| ES | 2009006 | A6 | 8/1989 |
| WO | WO9202713 | | 2/1992 |
| WO | WO2008105646 | | 9/2008 |
| WO | WO2020167108 | | 8/2020 |

* cited by examiner

*Primary Examiner* — Michael Leslie
(74) *Attorney, Agent, or Firm* — Defillo & Associates, Inc; Evelyn A. Defillo

(57) ABSTRACT

The hydraulic power increaser system includes: a power source (in this case, an electric motor), a hydraulic pump, a relief valve for safety, hydraulic conductors, a liquid fluid reservoir, 4-way directional valves operated by servo motors, and a digital/analog control system in conjunction with inductive proximity sensors located at the ends of the cylinders or boosters. Two boosters or cylinders are configured in series in the same line, each with an internal plunger that moves and displaces the fluid contained in the cylinders or boosters linearly. Hydraulic actuators or motors perform the work by transforming the energy of the system. All these aforementioned elements constitute the main block, which acts as a power source for the next secondary block, which contains the same elements as the main block except for the power source (in this case, an electric motor).

12 Claims, 8 Drawing Sheets

HYDRAULIC POWER BOOSTING SYSTEM

CROSS REFERENCE TO RELATED APPLICATION

This application is a national stage entry of PCT/MX2022/050036 filed Apr. 13, 2022, under the International Convention and claiming priority over Mexican Patent Application No. MX/a/2021/013474 filed Nov. 3, 2021.

TECHNICAL FIELD OF THE INVENTION

The present invention relates to a hydraulic system aimed at increasing the efficiency of the energy available to angular motion energy transformer systems to perform work, whether mechanical or involving pressure and volume displacement.

BACKGROUND OF THE INVENTION

The utility of water as a power source has been utilized since ancient times to perform various tasks, such as milling or transporting loads through channels and ditches. The application of the use of liquid fluids and their properties in more complex systems known as hydraulic circuits began to develop based on the foundations laid by Blaise Pascal. Nowadays, heavier tasks in the construction, agriculture, and manufacturing industries are carried out by liquid fluids and their properties. It is important to note that liquids, besides being practically incompressible, are excellent power transmitters in energy-transforming systems. Unlike steel, liquid fluids are much more flexible, taking the shape of the container that holds them. Therefore, any applied load at any point in the system will be replicated throughout the system with the same intensity and in equal areas, as long as the container is fully closed and saturated with fluid.

As is well-known, hydraulic systems are so versatile that they can be used in almost all sectors of industry and transformation, including manufacturing, transportation, electricity generation, healthcare, food production, among others.

In the prior art, there are various systems and applications, including conventional systems applied to presses, roll-forming machines, heavy machinery, etc. These typical systems consist of a power source, usually angular, a reservoir for liquid fluid, valves, pumps, motors, and pistons that perform the work or transformation. These systems are not as energy-efficient since the power source is always stressed to its limit, even when the system is not performing any work. Consequently, the power source wears out to maintain a constant pressure and volume. A pressure control valve with discharge to the reservoir is used for these systems when the system is not using pressure or volume. When the work is being carried out, the valve closes, allowing the pressurized liquid fluid to flow to the actuators.

In the prior art, there are pressure-increasing systems called boosters. These systems have the property of increasing the output pressure compared to the input and can be placed in tandem, greatly increasing pressure but decreasing volume on the same scale. Therefore, their final displacement is very limited. An example of this is brake boosters in a car, where the brake pedal advances several centimeters, but the brake pads or braking device only moves a few millimeters, yet with considerable force.

Regarding an application of pressure-increasing systems in electricity generation, it is essential first to understand the systems used in this field. The production of electrical energy has very specific and precise characteristics concerning a highly stable angular displacement. Electrical energy needs to be a high-quality product in terms of its angular displacement, which must be constant and very precise at 60 Hz in the American continent and 50 Hz in the European continent.

In this industrial sector, the state of the art is highly deficient, with efficiencies ranging from 30% to a maximum of 65%. Conventional electricity generation systems achieve 30%, combined cycle systems range from 50% to 65%, photovoltaic energy reaches 20%, and wind energy achieves 40%. It is important to note that 85% of electrical energy generation occurs by burning finite fossil fuels, which are utilized in a wide variety of applications and products, from the healthcare sector to food production and the manufacturing of various material goods.

In accordance with the above, in the prior art, there is the patent document ES2009006A6, which describes a pressure generator consisting of two pairs of hydraulic cylinders. The cylinders of each pair are connected at their ends by directional chambers closed with end caps. Each chamber contains a reel that moves due to the pressure from directional valves actuated by solenoids triggered by limit switches on the low-pressure cylinders. This setup generates high fluid pressure, reaching a connector and then flowing to the corresponding hydraulic motor. However, this pressure generator provided an energy conversion efficiency of up to 80%, as it uses a displacement gear pump and lacks a control system to manage directional changes of the plungers.

There is also the document WO9202713A1, which describes a pressure generator allowing pressure multiplication through sealed chambers containing stemless pistons that act on the fluid, serving as a force transmitter and concentrating force on the conical covers at each end of the piston. Due to the narrowing of the covers, the force is directed towards directional valves housed at the ends of the piston, distributing pressure in an organized manner through fluid conduits to the hydraulic motor. However, this invention does not utilize logical control systems or liquid cooling systems, and the overall efficiency of this system is 90% in energy conversion.

There is also the document WO9202713A1, which describes a hydraulic pressure intensifier coupled to a high-pressure hydraulic pump. The pump is actuated by a hydraulic reciprocating drive apparatus where a reciprocating low-pressure drive piston and a control valve system direct fluid from a pressurized fluid source alternately to opposite sides of the low-pressure piston. The control valve system comprises separate valves, one of which is adapted to be actuated by pressurized fluid and is arranged to reverse the action of the piston. Another valve is a pilot valve arranged to control the action of the reversing valve. The action of the reversing valve is stable and occurs over a relatively short period, while the action of the pilot valve occurs at the speed of the low-pressure piston's movement. A feature of the low-pressure drive apparatus is the absence of dynamic seals in the reversing valve and the pilot valve. However, this system lacks fluid cooling systems and does not specify the efficiency capacity in transmitting hydrostatic work to another system. Additionally, it does not indicate whether it could work in coordination (series or parallel) with other similar or identical pressure intensifiers, nor does it specify if it's possible to accumulate the pressure from the use of previous hydraulic intensifiers in the same line.

Similarly, there is the document US2005133090, which refers to a hydraulic pressure intensifier that allows energy recovery. It is composed of semipermeable membranes, positive displacement without valves and separate pumps or pump assemblies that move an uneven volume of fluid in a stable proportion within a shared circuit. The apparatus operates without the need for valves, cams, sliding fluid control parts, switches, timers, regulators, sensors, electrical or electronic circuits, or any other means of flow control, restriction, and/or distribution acting similarly. It can be powered by a variety of primary motors, such as rotary or ratchet connecting rods, wind turbines, water wheels, wave followers, and engines, as well as by a relatively low-pressure fluid feed provided by built-in or external feeding pumps or any other suitable means of low-pressure fluid feeding. However, in this system, it is not indicated whether it could work in coordination (series or parallel) with other similar or identical pressure intensifiers, and it does not specify if it's possible to accumulate the pressure from the use of previous hydraulic intensifiers. Moreover, flow control and, therefore, the persistence of pressure drops in the system are evident.

Therefore, in the state of the art, there is still no hydraulic pressure intensification system that efficiently harnesses energy from angular displacement systems for subsequent use in other systems requiring work at up to 100% efficiency. This system should allow the addition of hydraulic pressure in the same line or pipeline, avoid volume and pressure drops throughout the system, control the temperature increase of fluids under high pressure within the system, and operate at high frequencies (close to 60 Hz) continuously. The purpose is to be used in applications such as electricity generation and other applications requiring efficient energy and work transmission.

The patent WO2020167108 describes a high-efficiency energy transformation system in which cylinders are connected in series through hydraulic connectors. Each cylinder or booster has a pressure control valve as a load at its outlet. This valve acts as a load for each cylinder to increase the output pressure in each booster cylinder. The increased pressure is then applied to a final hydraulic motor with angular displacement responsible for performing the work. It is essential to note that the cylinders are double-acting devices and, similar to the descriptions in previous patents, do not have steel rods to perform the work. They solely use a piston located inside the cylinder, which, due to pressure, volume, and directional control mechanisms, moves from one end of the cylinder to the other. Simultaneously, the piston displaces the fluid located behind it, converting the fluid into a hydraulic power transmitter by applying pressure and volume provided by the energy source and pump. The hydraulic actuator or motor then converts hydraulic energy into angular mechanical energy to perform the work.

The plunger used in the system have perforations at their front ends that do not communicate with each other. This design aims to store volume and pressure in these perforations when the system is in operation. Thus, when the plunger reaches its limit of displacement at one end or the other, the directional change of the plunger occurs. During this moment, there tends to be a momentary drop in pressure and volume. At this point, due to pressure differences, the volume and pressure stored in the perforations of the plunger are released, preventing a momentary power drop with each directional change of the plunger.

It is important to mention that the cylinders or boosters use truncated cone-shaped caps at their ends to center and direct the volume displaced by the plunger or plungers. The conical geometric shape of the caps is efficient in concentrating the force in a smaller area of volume and pressure. However, due to the geometric shape of the caps, the fluid moves towards the smaller area turbulently, leading to cavitation that affects the system's operational principle. Gas bubbles generated by cavitation explode upon contact with steel, releasing gases and increasing the structural wear of internal valve elements and actuators. At the smaller diameter of the truncated cone caps of the cylinders, the outlet for the fluid displaced by the plungers is located. At the outlet of each cap, a two-way valve operated by external hydraulic piloting is connected, provided by the parallel system of directional changes to move the internal spool of the valve, releasing or covering the outlet and allowing or blocking the feeding of the cylinder ends. All of this, together with the stroke limit sensors, PLC, power source, and 4-way directional solenoid valves, controls the directional changes of the plungers.

It is worth noting that the parallel hydraulic system of the directional changes uses a pressure accumulator whose function is to store pressurized fluid and release it to the parallel working line to make the directional change in the shortest possible time.

At the rear outlet of the 2-way directional valves attached to the truncated cone caps, a pressure control valve is connected. The purpose of this valve is to increase the outlet pressure on both sides of the cylinder when displacing the fluid through the plungers, thereby increasing the system pressure. If the system uses more than two cylinders, the last one does not use a pressure control valve as a load because the load it bears is the hydraulic motor. The hydraulic motor's function is to transform hydraulic energy into angular mechanical energy to perform the work. Once the work is completed by the hydraulic motor, the fluid is returned to the reservoir to initiate a new cycle.

It should be mentioned that the parallel hydraulic system used for directional changes tends to heat the fluid. Therefore, it is necessary to connect a heat exchanger to the fluid return line to the reservoir to prevent excessive heating that could damage the fluid composition and, ultimately, affect internal parts of the system such as mechanical seals, pumps, actuators, conduits, etc.

In this patent, the direction of the plungers is interdependent, and any phase difference between them results in system failures.

OBJECT OF THE INVENTION

After analyzing the operation of pressure-boosting devices in the prior art, the new invention aligns with the configuration of cylinders arranged in series with the aim of increasing hydraulic pressure in the connecting line and achieving high efficiency in energy transformation, approaching nearly 100% efficiency.

One object of the invention is to change the geometric shape of the caps, replacing the truncated cone shape, as it induces turbulence in the liquid fluid when directed towards the outlet. In this invention, the caps have a pyramidal shape consisting of a simple polygon and triangles with a single side related to one side of the base polygon. Additionally, it incorporates an anti-cavitation system, consisting of steel plates arranged along the cap, attached to it (see FIG. 2).

Another object of the present invention is to replace the two-way directional valves attached to the ends of the truncated cone caps with a single 4-way directional valve for each cylinder. These valves control the inlet and outlet of each cylinder and operate rotationally. This modification reduces failures and lowers manufacturing costs.

Yet another object of this invention is to modify the plungers by replacing the holes that store volume and pressure to release them at each directional change. The volume and pressure released by the plunger holes are not sufficient to prevent noticeable power drops. Therefore, in this invention, the holes are replaced by a concave cavity on each face of the plunger. This cavity uses a high-pressure-resistant neoprene membrane as a seal to prevent nitrogen leakage previously placed in the concave cavity. When the plunger moves towards either end of the cylinders, the fluid pressure on the membrane tends to pressurize the nitrogen, accumulating pressure and volume. Subsequently, these are released at each directional change, avoiding power drops due to directional changes. The volume and pressure stored in the concave area of the plunger are sufficient to prevent power drops. FIG. 3 illustrates the concave shape, the placement of the membrane, and the nitrogen filling process.

Another object of this invention is to replace the parallel hydraulic directional change system, which causes failures, heating, and reduced efficiency, with an electromechanical system comprising servo motors, PLC, sensors, control cards, and the aforementioned 4-way directional valves with mechanical piloting. These valves are responsible for controlling the directional changes of the plungers by covering and uncovering the outlets and inlets of the cylinders.

An objective of the present invention is to replace the pressure regulating valves described in patent number WO2020167108, which have the function of increasing pressure in the system, with hydraulic actuators of angular displacement known as hydraulic motors. These hydraulic motors are connected to the outlet of each cylinder or booster after the 4-way directional valves. The hydraulic actuator or motor serves as a load to increase pressure in its respective booster or cylinder, converting the pressurized volume displaced by the plungers into angular displacement to perform the work. They are connected by a mechanical transmission to combine the efforts of both hydraulic actuators (see FIG. 1). This objective significantly increases the efficiency of the system since this new invention utilizes the pressure that the previous system wasted on compressing the spring of the pressure control valve.

Another objective of this new invention is the replacement of the unidirectional drive coupling used in patent WO2020167108 to protect the integrity of the system. The previous coupling used cams and pivots, which functioned correctly but tended to break the pivots due to the large moment the lever exerted during dragging. It has been replaced by a drive coupling with helical cavities and submersible pivots pushed by springs, providing better efficiency and eliminating high lever moments on the pivots during dragging.

Yet another objective of this new invention, due to its design and configuration, allows total freedom of plungers direction, eliminating the interdependence to which they were previously subjected in terms of direction.

The aforementioned objectives are achieved with the high-efficiency hydraulic power increasing system. The system, being a hydraulic circuit, is composed of several elements, some typical of a hydraulic circuit, such as a power source, in this case, an electric motor. The system can also use other energy sources, whether mechanical, chemical, or electrical. In addition to the power source, the system has a pump coupled to an energy source. The pump is connected to the fluid reservoir through the absorption port, and the outlet port is connected to the feed manifold. From the manifold, hydraulic conduits are derived to the 4-way directional control and feed valve. From the aforementioned manifold, a calibrated safety valve is connected to open before reaching a maximum pre-set pressure. When the pressure exceeds the calibration, the valve opens and discharges into the reservoir.

From the 4-way valve, the supply lines are derived, connecting to the booster or cylinder on its lateral sides. From the booster's outlet ends, lines are connected to carry the output flow to the 4-way valve. Hydraulic conduits connecting to the manifold entering the hydraulic actuator or motor are connected to the valve. At the hydraulic motor's outlet port, a manifold is connected, from which lines are derived to connect to the second 4-way directional valve. The outlet lines of the second valve are connected to the supply lines for the second booster or cylinder. From the booster's outlet ends, lines are connected to the second valve, and the second valve's outlets are connected to the hydraulic conduits leading to the manifold of the second hydraulic motor. From the outlet port of the hydraulic motor, it connects to the manifold (24) to carry the fluid to the cooling system (25) and be discharged into the reservoir (3) for reuse in a new cycle.

This description corresponds to one block. Depending on the application, N number of blocks can be interconnected. It is also possible to create a block with a single booster or cylinder and its necessary components, such as a hydraulic pump, 4-way valve, relief valves, hydraulic conduits, hydraulic motors, fluid reservoir, electronics, among others.

The 4-way valves presented in this description are rotated to unblock and block the outlet and inlet ports, depending on the direction of the plunger inside the cylinder or booster. This is achieved through servo motors controlled by cards connected to a PLC. In other words, the internal spool that blocks and unblocks the ports is rotated.

SUMMARY OF THE INVENTION

The hydraulic power increaser system utilizes the physical principles of liquid fluids contained in a completely saturated and sealed container or system, achieving the transformation of the work generated by the load into pressure. This pressure is then applied to the actuators to make the use of available energy in the system more efficient. The transformation of work generated by the load into pressure results from the constant dynamic volume pressed by the load and the source through a concave differential of areas.

DETAILED DESCRIPTION OF THE INVENTION

Below, the operation of the hydraulic power increaser system is detailed.

It is important to mention first that the hydraulic system, due to its characteristics, needs to be completely saturated with liquid fluid and purged before starting.

In this system, an external energy source is available that powers the electric motor. When the starter is energized, the electric motor (1) converts electrical energy into angular mechanical energy, thus driving the hydraulic pump (2), which is mechanically connected to the electric motor (1) of the first block of the system. By activating the hydraulic pump (2), it begins to draw fluid from the reservoir (3) through its suction port.

Figure 4:
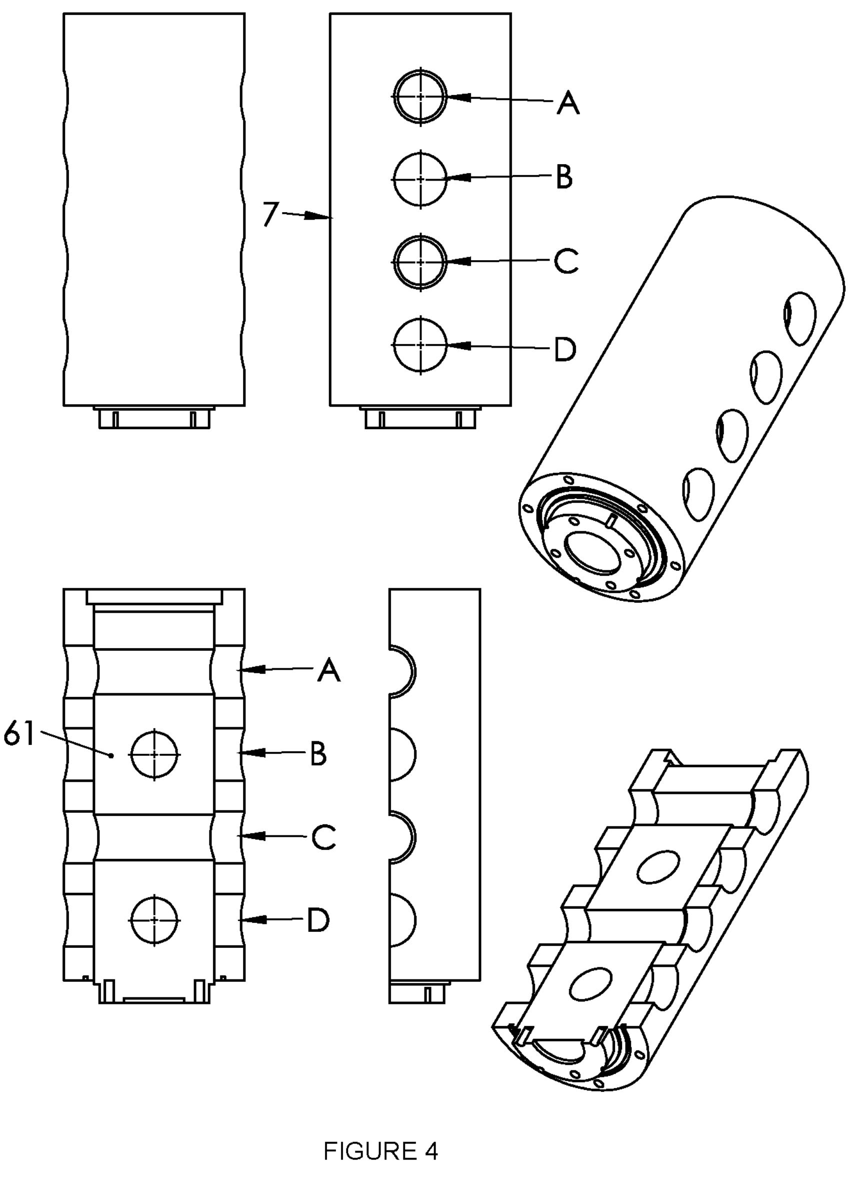
FIG. 4: This figure represents the position of the internal spool (61) of the 4-way directional valve (7), randomly as in FIG. 1.
Figure 5:
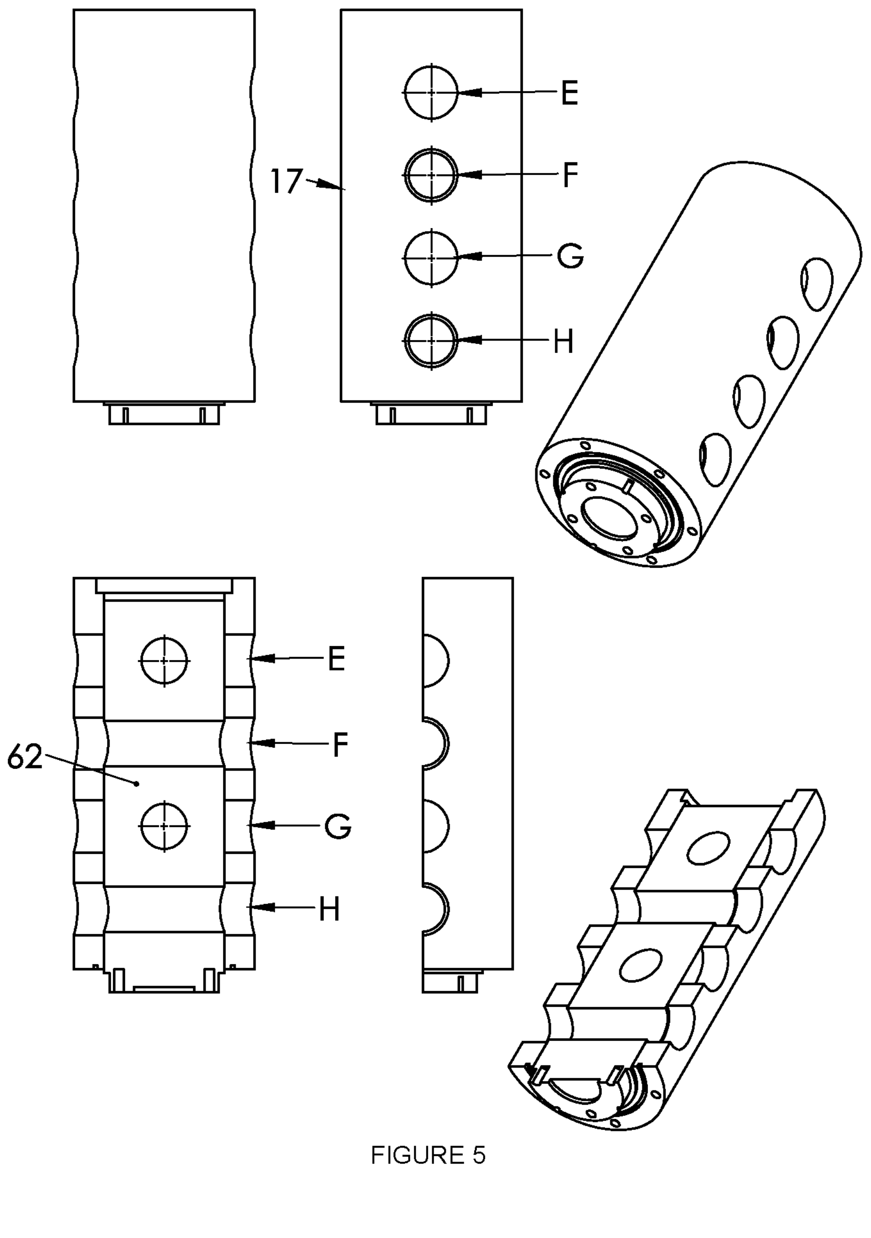
FIG. 5: This figure represents the position of the internal spool (62) of the 4-way directional valve (17), randomly as in FIG. 1.

At this point, the displacement of the volume that feeds the system begins. This volume displacement is one of the two fundamental conditions for forming a hydraulic system. From the outlet port of the hydraulic pump (2), the manifold (4) is connected, from which the supply lines (5) and (6) derive. These lines conduct the fluid to the first 4-way valve (7). The supply line (5) is connected to port C of the 4-way valve (7), and supply line (6) is connected to port B of the same valve. The position of the spool (61) of the 4-way valve (7) is shown in FIG. 4. From port C of the valve (7), supply line (5) connects to one side of the right cap (37) of the booster or cylinder (8). From the outlet of the right cap (37) of the booster or cylinder (8), the working line (10) is connected, which connects to port D of the 4-way valve (7). In this position of the spool (61) of the 4-way valve (7), ports A and C are unblocked, while ports B and D are blocked. From the rear port B of the 4-way valve (7), supply line (6) continues connecting to the left cap (38) of the booster or cylinder (8). From the outlet of the left cap (38) of the booster or cylinder (8), the working line (9) is connected to rear port A of the 4-way valve (7). From port G of the 4-way valve (17), supply line (15) is connected, and from port F of the same valve, supply line (16) is connected. The position of the spool (62) of the 4-way valve (17) is shown in FIG. 5.

After port F of the 4-way valve (17), supply line (16) continues connecting to the left side cap (39) of the booster or cylinder (18). From the outlet of the right cap (40) of the booster or cylinder (18), the working line (19) is connected, which connects to port H of the 4-way valve (17). From rear port G of the 4-way valve (17), supply line (15) continues connecting to the right side cap (40) of the booster or cylinder (18), and from the outlet port of the left cap (39) of the booster or cylinder (18), the working line (19) connects to port H of the 4-way valve (17). Through supply line (16), the fluid displaced by the plunger (11) is directed to the port of the left cap (39) of the booster or cylinder (18) to begin moving the plunger (20) to the right side (40) of the booster or cylinder (18) and, at the same time, displace the fluid located on the rear side of the plunger (20). The fluid displaced by the plunger (20) is directed to the outlet port of the right cap (40) of the booster or cylinder (18), which connects to the working line (19) and passes through the 4-way valve (17) through port H. The fluid goes to the manifold (22), which is connected directly to the inlet port of the hydraulic motor or angular actuator (23). Passing through the hydraulic motor (23), it converts hydraulic energy into angular mechanical energy.

The fluid flows through the outlet port of the hydraulic motor (23), discharging into the manifold (24), which is directly connected to a cooling system (25) to return the fluid to the reservoir (3), maintaining an appropriate temperature for reuse in subsequent cycles.

Figure 1:
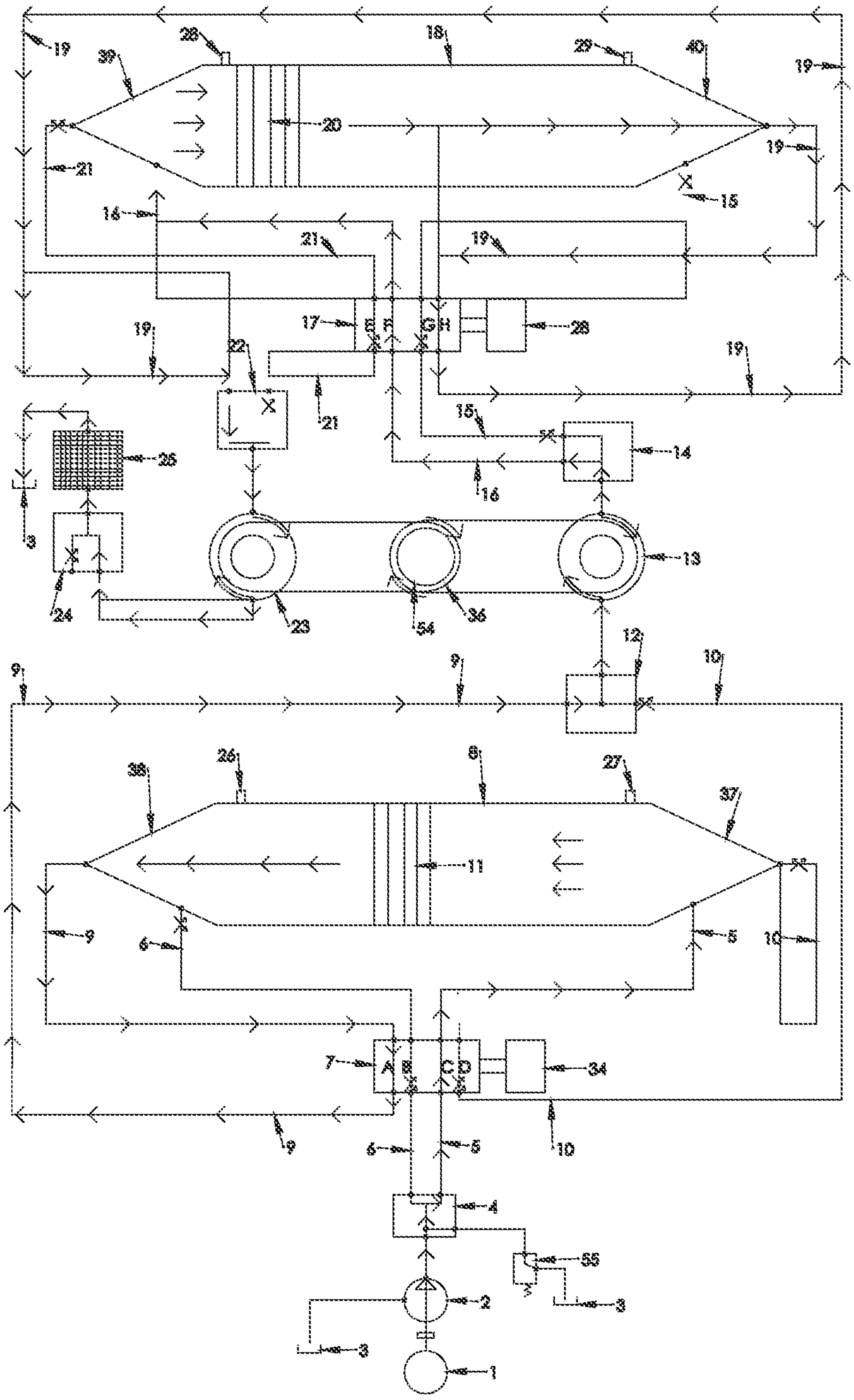
FIG. 1: This figure represents the general diagram of the hydraulic system of this invention, with the positions of the plunger and valves arranged randomly.
Figure 2:
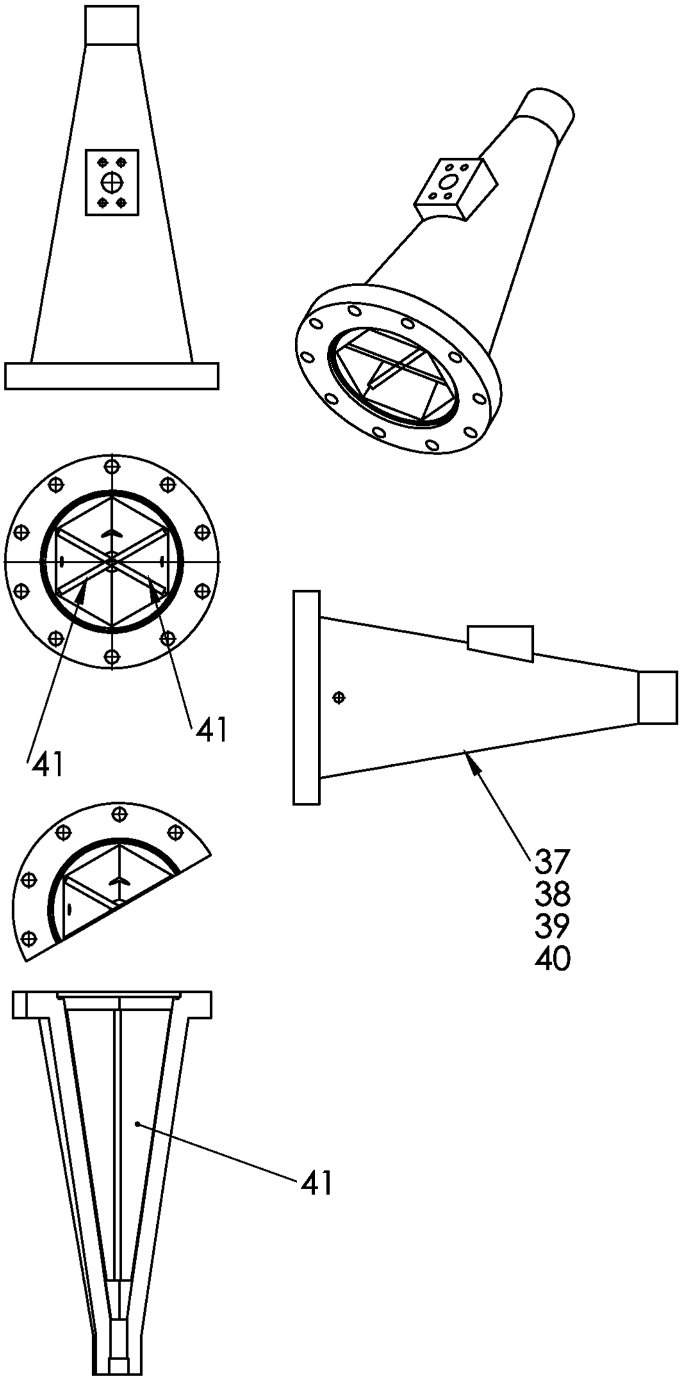
FIG. 2: This figure represents the geometric shape of the caps (37), (38), (39), and (40) of this invention and the anti-cavitation plates (41).
Figure 3:
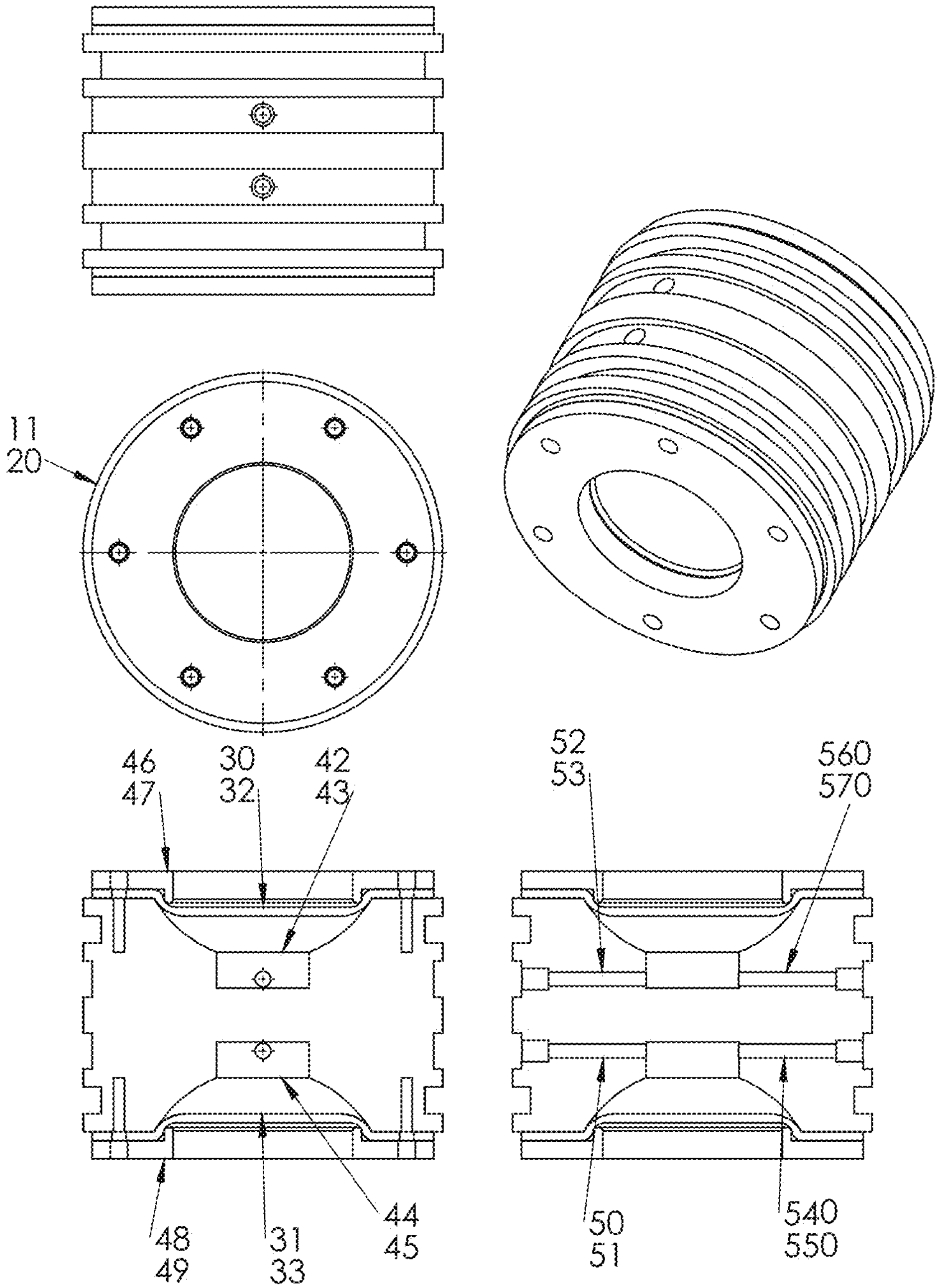
FIG. 3: This figure represents the plunger (11) and (20), their cavities (42), (43), (44), and (45), their membranes (30), (31), (32), and (33), their caps (46), (47), (48), and (49), their nitrogen supply bores (50), (51), (52), and (53), and their purge bores (540), (550), (560), and (570).

This description of a random state of the system can be seen in FIG. 1, where the direction of the plunger does not depend on each other.

Note in FIG. 1 that the plunger (11) of the cylinder or booster (8) will reach its stroke limit marked by the inductive proximity sensor (26) before the plunger (20) of the booster or cylinder (18), without affecting the system's operation in any way.

Once the plunger (11) of the booster or cylinder (8) has activated the output of the inductive proximity sensor (26), it will send a signal to the control system for the servo motor (34) to rotate and turn the spool (61), producing a directional change. This change involves blocking ports A and C of the directional valve (7) and unblocking ports B and D of the directional valve (7).

Figure 6:
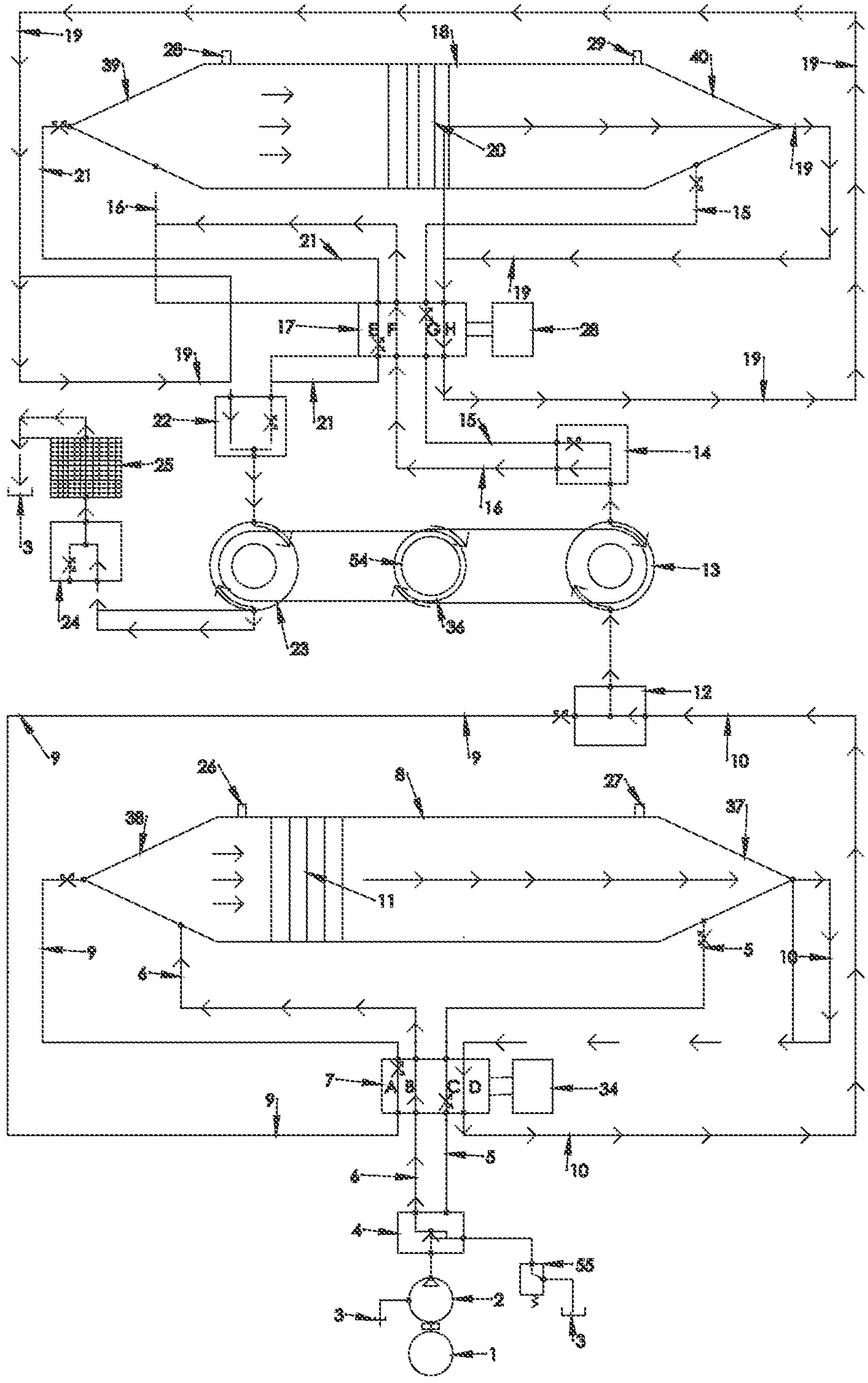
FIG. 6: This figure represents the system after a directional change in the plunger (11), taking into account the random initial position of the system represented in FIG. 1. This occurs after the blocked ports of the valves (7) are unblocked, and the unblocked ports of the valve (7) are blocked.
Figure 7:
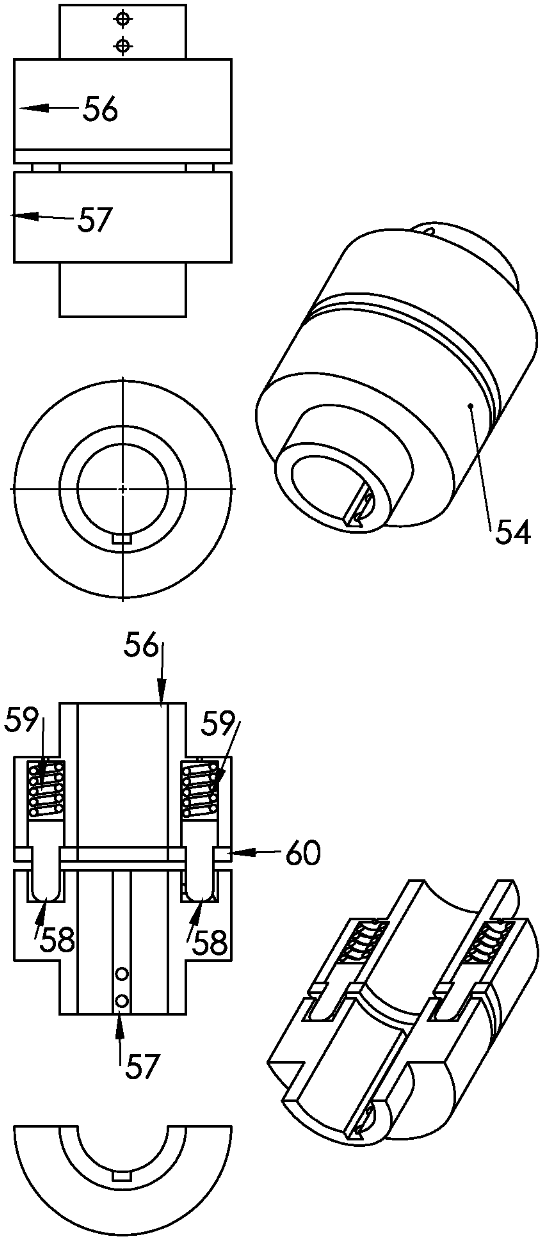
FIG. 7: This figure represents the unidirectional mechanical drive coupling (54), which will be used to protect the system in case of a sudden emergency stop. Its parts are shown: male (56), female (57), drive bolts (58), springs (59), and the safety plate (60).

After the aforementioned directional change, the plunger (11) now moves from left to right as shown in FIG. 6. At this moment, the plunger (20) has not yet reached its stroke limit, so in FIG. 6, it still has the same direction as in FIG. 1. Both plunger moving in the same direction.

Figure 8:
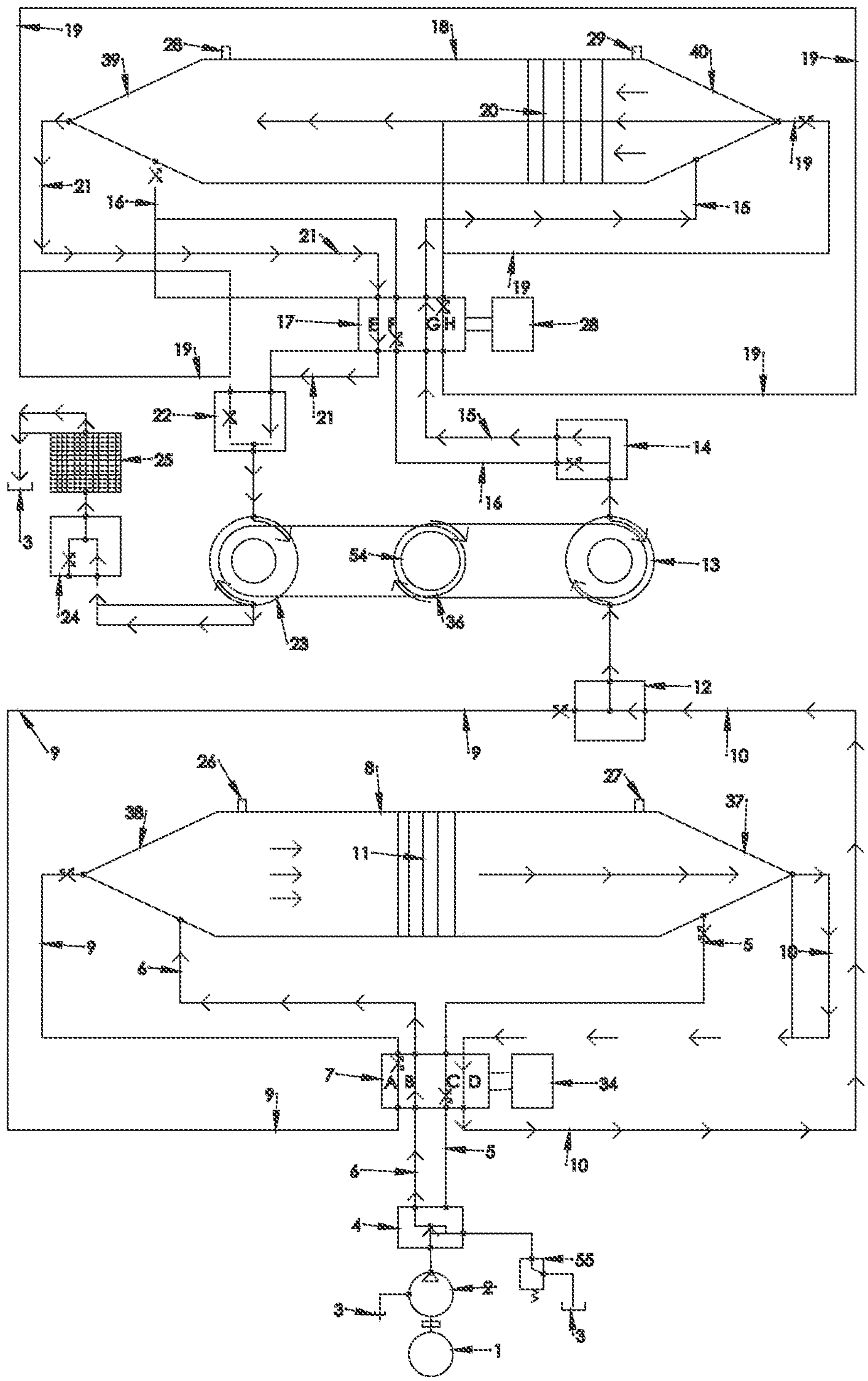
FIG. 8: This figure represents the system after a directional change in the plunger (20), considering the random initial position of the system represented in FIG. 1. This occurs after the blocked ports of the valves (17) are unblocked, and the unblocked ports of the valve (17) are blocked.

Once the plunger (20) of the booster or cylinder (18) has activated the output of the inductive proximity sensor (29), it will send a signal to the control system for the servo motor (28) to rotate and turn the spool (62), producing a directional change. This change involves blocking ports F and H of the 4-way directional valve (17) and unblocking ports E and G of the 4-way directional valve (17), as shown in FIG. 8.

It is necessary to mention that the plungers (11) and (20) move independently of each other, eliminating directional dependence between them, meaning the direction of one plunger does not affect the direction of the other.

This is the description of the working cycle of a block. Depending on the applications, other blocks can be interconnected in series, starting with another hydraulically driven pump, through a transmission, by the two hydraulic motors (13) and (23). The new pump will act as a load or work for the first block. Similarly, motors (13) and (23) can be connected by a transmission (36) to use that energy in the work being done, either to generate electrical energy with a generator or to use mechanical energy for physical work.

The invention claimed is:

1. A hydraulic power increaser system comprising:

a main drive system; and a directional change system;

wherein said main drive system comprises a main motor generating angular power, a pump connected to said main motor and to a fluid reservoir, which sucks said fluid and displaces the fluid fluidly; a pump to provide fluid at a first pressure comprising; a first booster or cylinder having inside: a plunger that moves linearly from an initial position to a final position and a stroke limit sensor at each end of said booster or cylinder; a 4-way directional valve connected to both ends of the booster or cylinder, which restricts or allows the passage of fluid into or out of the booster or cylinder; feeding a first hydraulic motor, at a second pressure, which functions to convert the hydraulic energy from the first booster or cylinder into angular mechanical energy to perform work, from the outlet of the first hydraulic motor, a pressure remnant is obtained, considered as a third pressure, and a same volume, which are conducted by working lines until connecting with a second 4-way directional valve, which in turn restricts the inputs and outputs of a second booster or cylinder; said second booster or cylinder comprises inside: a plunger that moves linearly from an initial position to a final position and a stroke limit sensor at each end of said booster or cylinder; the second 4-way directional valve connected to both ends of the second booster or cylinder, which restricts or allows the passage of fluid into or out of the second booster or cylinder, wherein said second piston increases the third pressure of the fluid to obtain a fourth pressure; a second hydraulic motor, fluidly connected to said second 4-way directional valve, which receives the fluid at the fourth pressure to convert the fluid into angular mechanical energy to perform work; a fluid cooling device, which cools the fluid from the second hydraulic motors to send the fluid to the fluid reservoir and start a new cycle indefinitely.

2. The hydraulic power increaser system according to claim 1, wherein the main motor is an electric motor.

3. The hydraulic power increaser system according to claim 1, wherein the plungers move independently of each other, eliminating the directional subordination between the plungers.

4. The hydraulic power increaser system according to claim 1, wherein a position of the cylinders does not interfere with their operation.

5. The hydraulic power increaser system according to claim 1, wherein each plunger has a cavity on front faces to store nitrogen, which communicates through four lateral holes for purging and filling said cavity.

6. The hydraulic power increaser system according to claim 5, wherein to cover said cavity and prevent nitrogen leakage, a pressure-resistant membrane is installed, attached to the plunger through a cover.

7. The hydraulic power increaser system according to claim 1, wherein covers located at the ends of both ends of each booster or cylinder have a pyramidal shape including a simple polygon and triangles with a single side related to one side of the base polygon.

8. The hydraulic power increaser system according to claim 7, wherein the pyramidal shapes of the covers located at the ends of both ends of each booster or cylinder have an inclination angle between 1° to 45°.

9. The hydraulic power increaser system according to claim 7, wherein an anti-cavitation system is located inside the covers, wherein the anti-cavitation system includes plates.

10. The hydraulic power increaser system according to claim 1, wherein the system has applications on different scales by changing the diameters and lengths of the cylinders or boosters.

11. The hydraulic power increaser system according to claim 1, wherein the system uses a unidirectional drive coupling in a final power take-off.

12. The hydraulic power increaser system according to claim 11, further including helical concave cavities so that the drive pins transmit torque or force in only one direction, either clockwise or counterclockwise.

* * * * *